(12) United States Patent
Narushima

(10) Patent No.: US 6,341,832 B1
(45) Date of Patent: Jan. 29, 2002

(54) PRINTER APPARATUS, PRINTER SYSTEM, AND DRIVING METHOD OF PRINTER APPARATUS

(75) Inventor: Toshio Narushima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/104,284

(22) Filed: Jun. 25, 1998

(30) Foreign Application Priority Data

Jun. 30, 1997 (JP) .............................................. 9-174796

(51) Int. Cl.[7] ................................................. B41J 2/01
(52) U.S. Cl. ......................................... 347/14; 358/457
(58) Field of Search ............................... 347/5, 19, 20, 347/21, 183, 14, 40; 358/298, 448, 457

(56) References Cited

U.S. PATENT DOCUMENTS 6,030,068 A * 2/2000 Narushima ................... 347/40

FOREIGN PATENT DOCUMENTS

| EP | 0 398 000 A1 | 11/1990 |
| EP | 0 538 147 A2 | 4/1993 |
| EP | 0 655 337 A2 | 5/1995 |
| EP | 0 650 840 A2 | 5/1998 |

* cited by examiner

Primary Examiner—Anh T. N. Vo
(74) Attorney, Agent, or Firm—Ronald P. Kananen; Rader, Fishman & Grauer

(57) ABSTRACT

A carrier jet printer includes an output characteristic conversion circuit for converting an input signal that includes information on dots to be printed into a print signal that is necessary for printing by performing predetermined conversion processing on the input signal, and a printer head for printing dots on a recording medium by forming an ink liquid for each dot by mixing ink and a dilute based on the print signal so that the density of the ink liquid corresponds to that of the dot, and jetting the ink liquid onto the recording medium. The output characteristic conversion circuit converts the input signal into the print signal so that the printer head mixes the ink into the dilute even in a case where printing is performed based on an input signal that includes information on a dot of the lowest density.

15 Claims, 17 Drawing Sheets

PRINTER APPARATUS, PRINTER SYSTEM, AND DRIVING METHOD OF PRINTER APPARATUS

BACKGROUND OF THE INVENTION

The present invention relates to a printer apparatus, a printer system, and a driving method of a printer apparatus in which ink and a diluent (liquid) are mixed with each other immediately before being jetted onto a recording medium.

The document publishing using a computer which is called desk top publishing has become popular particularly in offices and like environments. In recent years, there have increased demands for, outputting a color photo-like image such as a photograph together with a text and/or a figure a rather than outputting only a text and/or a figure. Therefore, now it is required to print a high-quality photo-like image and the expression of gradation using halftone display is important.

In recent years, what is called an on-demand printer apparatus which performs recording by jetting ink droplets from nozzles only when necessary during printing in accordance with control signals that correspond to recording signals, to thereby deposit the ink droplets on a recording medium such as a sheet or a film has spread at high speed because it is suitable for miniaturization and cost reduction.

Although various methods for jetting an ink droplet from a nozzle as mentioned above have been proposed, a method using a piezoelectric element and a method using a heating element are now commonly used. In the former method, ink is jetted by applying pressure to it by utilizing deformation of a piezoelectric element. In the latter method, ink is jetted by pressure of bubbles that are generated by heating and vaporizing ink in a nozzle with a heating element.

There have been proposed various methods for simulating, in the above-mentioned on-demand printer apparatus that jets ink droplets, the above-mentioned expression of gradation using halftone display. In a first method, the gradation is expressed by controlling the size of a jetted droplet by varying the amplitude or pulse width of a voltage applied to a piezoelectric element or a heating element and thereby making the printing dot diameter variable.

However, in the first method, if a voltage applied to a piezoelectric element or a heating element is too low or its pulse width is too small, ink is not jetted. Therefore, the minimum droplet diameter has a certain limit, which causes a problem that the number of expressible gradation levels is small and particularly a problem that it is very difficult to express low-density levels. The first method is thus insufficient for printing of a photo-like image.

In a second method, each pixel is formed by a matrix of, for instance, 4×4 dots without varying the dot diameter and the gradation is expressed by performing image processing of what is called a dither method or an error diffusion method on a matrix-by-matrix basis.

However, in the second method, although densities of 17 gradation levels can be expressed when each pixel is formed by a 4×4 matrix, the resolution is lowered to ¼ if, for instance, printing is performed with the same dot density as in the first method, in which case a resulting image may have marked roughness. Therefore, the second method is also insufficient for printing of a natural image.

In view of the above, to solve the problems of the conventional on-demand printer apparatuses in terms of the principle of operation, the present inventors proposed a printer apparatus having an external mixing type printer head which performs recording by forming an ink liquid by mixing ink and a transparent solvent as a dilute at a given mixing ratio and jetting the ink liquid immediately thereafter to deposit it on a recording medium (for example, refer to Japanese Unexamined Patent Publication Nos. Hei. 5-201024 and Hei. 7-195682).

In the printer head of this printer apparatus, a quantifying nozzle is provided adjacent to a jetting nozzle and a quantified ink liquid is deposited on a recording medium in the following manner.

First, ink of a predetermined amount flows out of the quantifying nozzle and moves to the jetting nozzle and its vicinity. Then, a dilute is jetted from the jetting nozzle and mixed with the ink existing at the jetting nozzle and its vicinity at this time, to form an ink liquid having a desired-ink density. A droplet of the thus-mixed ink liquid is jetted toward a recording medium and deposited thereon.

In the above carrier jet printer apparatus, the density of a mixed solution that is jetted is controlled by varying the mixing ratio between ink and a dilute by changing the amount of a quantifying medium that is the ink or the dilute. In this manner, the density can be varied on a printed dot basis. Therefore, it is possible to print out a photo-like image with many intermediate gradation levels without lowering the resolution.

SUMMARY OF THE INVENTION

In the above carrier jet printer apparatus, the relationship between a drive signal that is applied to a quantifying-medium-side or jetting-medium-side pressure generating section, particularly the quantifying-medium-side pressure generating section, and the density of an ink liquid formed by quantifying and then mixing a quantifying medium and a jetting medium is not a simple relationship such as a proportional relationship.

That is, in the printer head of the carrier jet printer apparatus, there may occur an event that when a drive voltage is applied to the quantifying-medium-side pressure generating section based on a drive signal obtained by converting a print signal, if the drive voltage is low particularly a quantified ink is pushed out from the quantifying nozzle only to inflate and does not reach the vicinity of the jetting nozzle. As a result, when a dilute is jetted from the jetting nozzle, it cannot be mixed with the ink. In this case, only the dilute is deposited on a recording medium.

Therefore, the above mentioned printer apparatus has a problem that gradation levels cannot be expressed in a desired manner when the printer head is driven by using drive signals obtained by converting print signals.

The present invention has been made in view of the above circumstances in the art, and an object of the invention is therefore to provide a printer apparatus, a printer system, and a driving method of a printer apparatus which can control, with high accuracy, the density of an ink liquid that is a mixture of ink and a dilute so that it becomes a desired value, and which can therefore express gradation levels in a desired manner.

A printer apparatus according to the invention that has been completed to attain the above object comprises a converting section for converting an input signal that includes information on dots to be printed into a print signal that is necessary for printing by performing predetermined conversion processing on the input signal; and dot printing means for printing dots on a recording medium by forming an ink liquid for each dot by mixing ink and a dilute in a predetermined ratio based on the print signal, and jetting the ink liquid onto the recording medium.

In particular, in the printer apparatus according to the invention, the converting section converts the input signal into the print signal so that the dot printing means mixes the ink into the dilute even in a case where printing is performed based on an input signal that includes a dot information which is below a threshold density determined by the dot printing means.

In the above-configured printer apparatus according to the invention, since the converting section is provided that converts the input signal into the print signal so that the dot printing means mixes the ink into the dilute even in a case where printing is performed based on an input signal that includes information on a dot of the lowest density, ink of a correct amount can be mixed into a dilute even when printing is performed based on an input signal of a low density. Therefore, correct gradation expression is enabled, and there can be avoided a phenomenon that quantified ink is not mixed with a dilute even if the dot printing means is driven.

The converting section need not always be provided in the printer apparatus, and may be provided outside the printer apparatus and connected to it as in the case of a printer system according to the invention.

That is, the printer system according to the invention comprises a converting section for converting an input signal that includes information on dots to be printed into a print signal that is necessary for printing by performing predetermined conversion processing on the input signal; and a printer apparatus comprising dot printing means for printing dots on a recording medium by forming an ink liquid for each dot by mixing ink and a dilute in a predetermined ratio based on the print signal, and jetting the ink liquid onto the recording medium.

In particular, in the printer system according to the invention, the converting section converts the input signal into the print signal so that the dot printing means mixes the ink into the dilute even in a case where printing is performed based on an input signal that includes a dot information which is a threshold density determined by the dot printing means.

In the above-configured printer system according to the invention, since the converting section that performs the above conversion processing is provided, ink of a correct amount can be mixed into a dilute even when printing is performed based on an input signal of a low density. Therefore, correct gradation expression is enabled, and there can be avoided a phenomenon that quantified ink is not mixed with a dilute even if the dot printing means is driven.

A driving method of a printer apparatus according to the invention comprises the steps of converting an input signal that includes information on dots to be printed into a print signal that is necessary for printing by performing predetermined conversion processing on the input signal; and printing dots on a recording medium by forming an ink liquid for each dot by mixing ink and a dilute in a predetermined ratio based on the print signal, and jetting the ink liquid onto the recording medium.

In particular, in the driving method of a printer apparatus according to the invention, in the predetermined conversion processing the input signal is converted into the print signal so that the ink is mixed into the dilute even in a case where printing is performed based on an input signal that includes information on a dot of the lowest density.

In the above-configured driving method of a printer apparatus according to the invention, since the above conversion processing is provided, there can be avoided a phenomenon that quantified ink is not mixed with a dilute even if a dot printing means is driven.

DETAILED DESCRIPTION OF THE PREFERRED EMBODIMENTS

The embodiments of the present invention will be hereinafter described in detail with reference to the drawings.

A printer apparatus to which the invention is applied is an ink jet printer having an external mixing type printer head, that is, a carrier jet printer apparatus (hereinafter referred to as a carrier jet printer). Although in the following description a digital signal is used as an example of an input signal including information on dots to be printed, it may be an analog signal.

Figure 1:
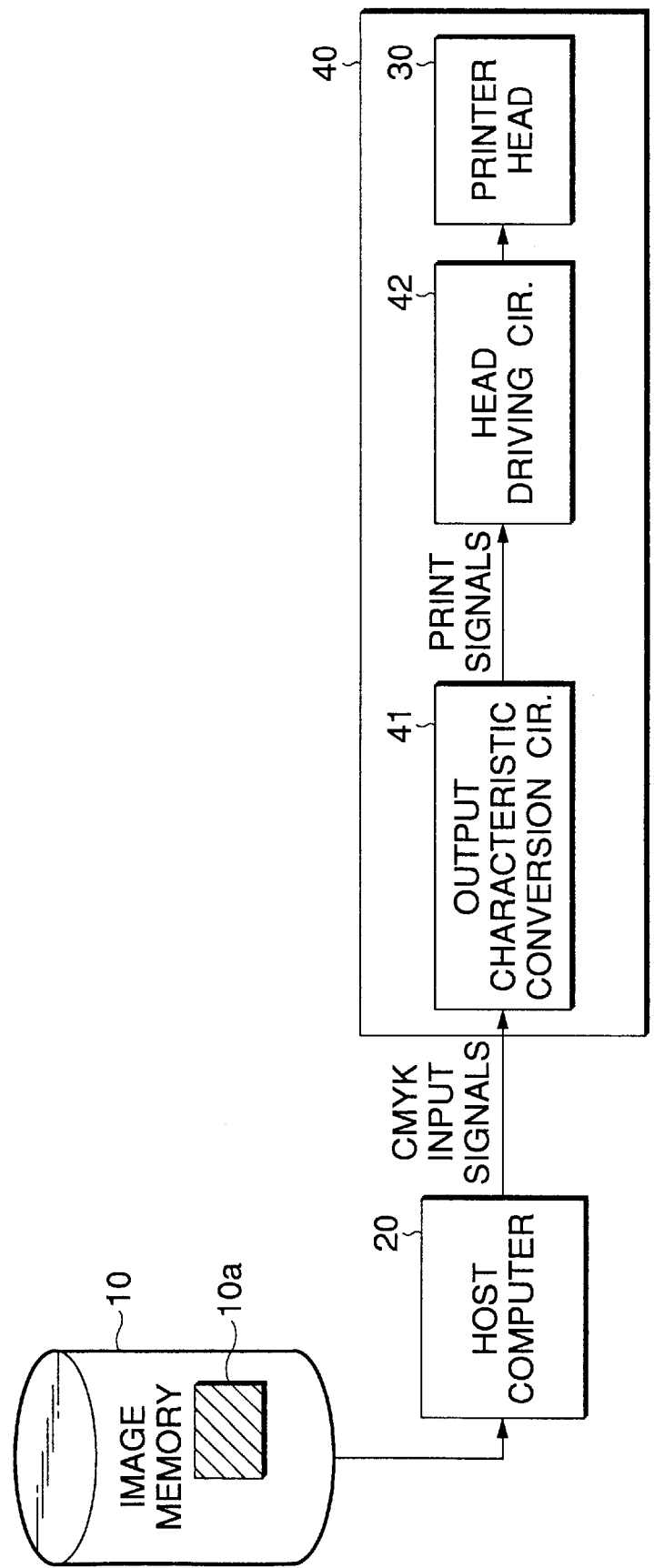
FIG. 1 is a block diagram showing an example of a printer system including a printer apparatus to which the present invention is applied.

To begin with, the entire configuration of a printer system will be described. FIG. 1 is a block diagram showing the entire configuration of a printer system.

The printer system is composed of an image memory 10 that stores a plurality of image files 10a, a host computer 20 for converting color signals of R (red), G (green), and B (blue) into dot-information-inclusive input signals of C (cyan), M (magenta), Y (yellow), and K (black) and a carrier jet printer 40 that performs recording by performing signal processing on the input signals by using an output characteristic conversion circuit 41, a head driving circuit 42, and a printer head 30. The output characteristic conversion circuit 41 is an example of converting means and the printer head 30 is an example of dot printing means.

A parallel interface such as IEEE Std 1284 (bi-Centronics) or SCSI-2 is employed as an interface for connecting the host computer 20 and the carrier jet printer 40, because it has a large number of transfer signals. In addition to the above parallel interface, a serial interface such as RS-232C or RS-422 may be used as the interface for connecting the host computer 20 and the carrier jet printer 40.

The host computer 20 is composed of a CPU (central processing unit), a flash memory, a RAM (random access memory), and other known components. The host computer 20 reads an image file 10a a from the image memory 10, performs various kinds of signal processing (described later), and then outputs signals including information on dots to be printed that are necessary for scanning of the printer head 30 to the carrier jet printer 40. The carrier jet printer 40 performs various kinds of signal processing on the input signals including dot information that have been received from the host computer 20, and performs printing on a recording sheet based on the signals obtained by the signal processing.

The image memory 10 is constituted of hard disks, a CD-ROM, or the like. The configuration of the carrier jet printer 40 will be described later.

Figure 2:
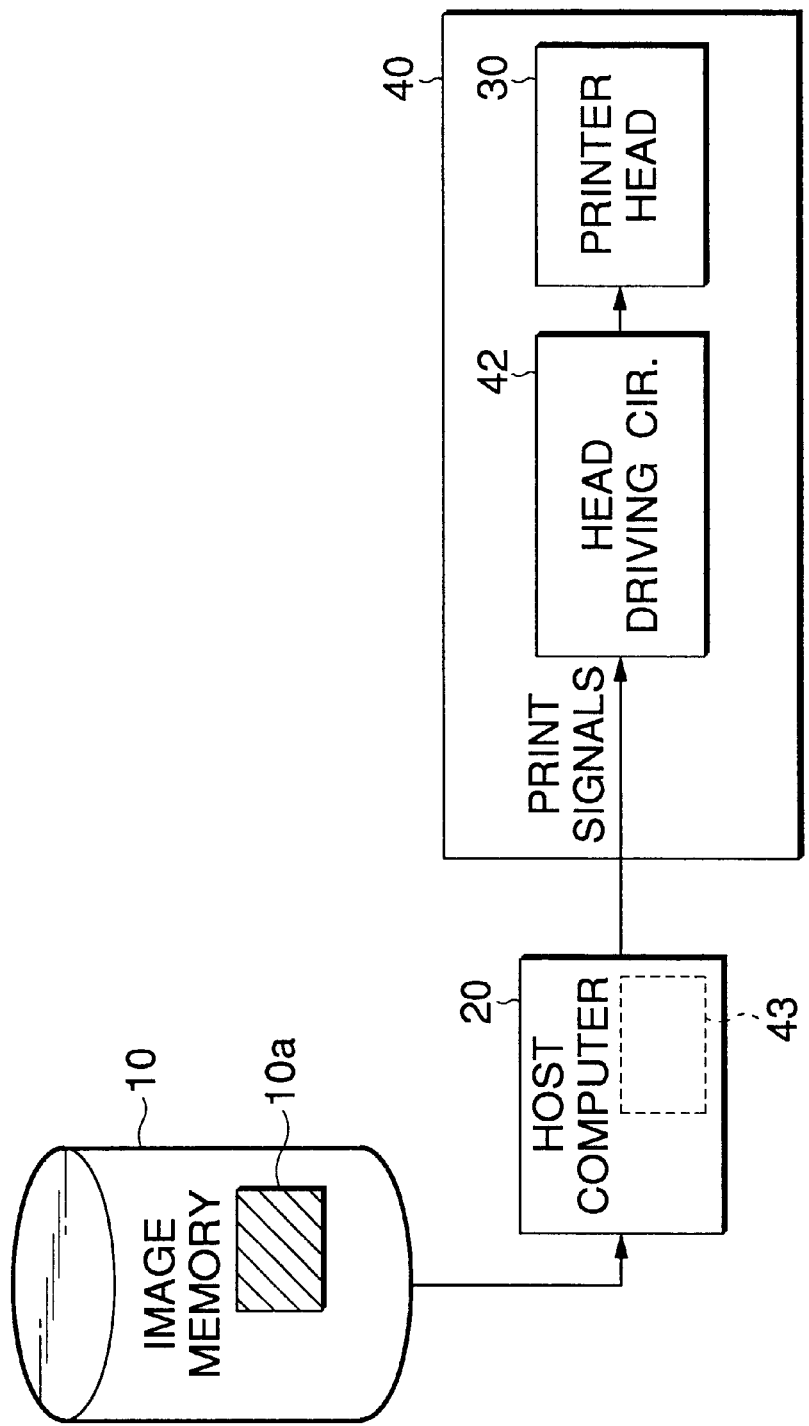
FIG. 2 is a block diagram showing another example of a printer system to which the invention is applied.

FIG. 2 shows another preferable configuration of a printer system according to the invention in which a converting means 43 is implemented by software in the host computer 20 rather than provided in the carrier jet printer 40.

Figure 3:
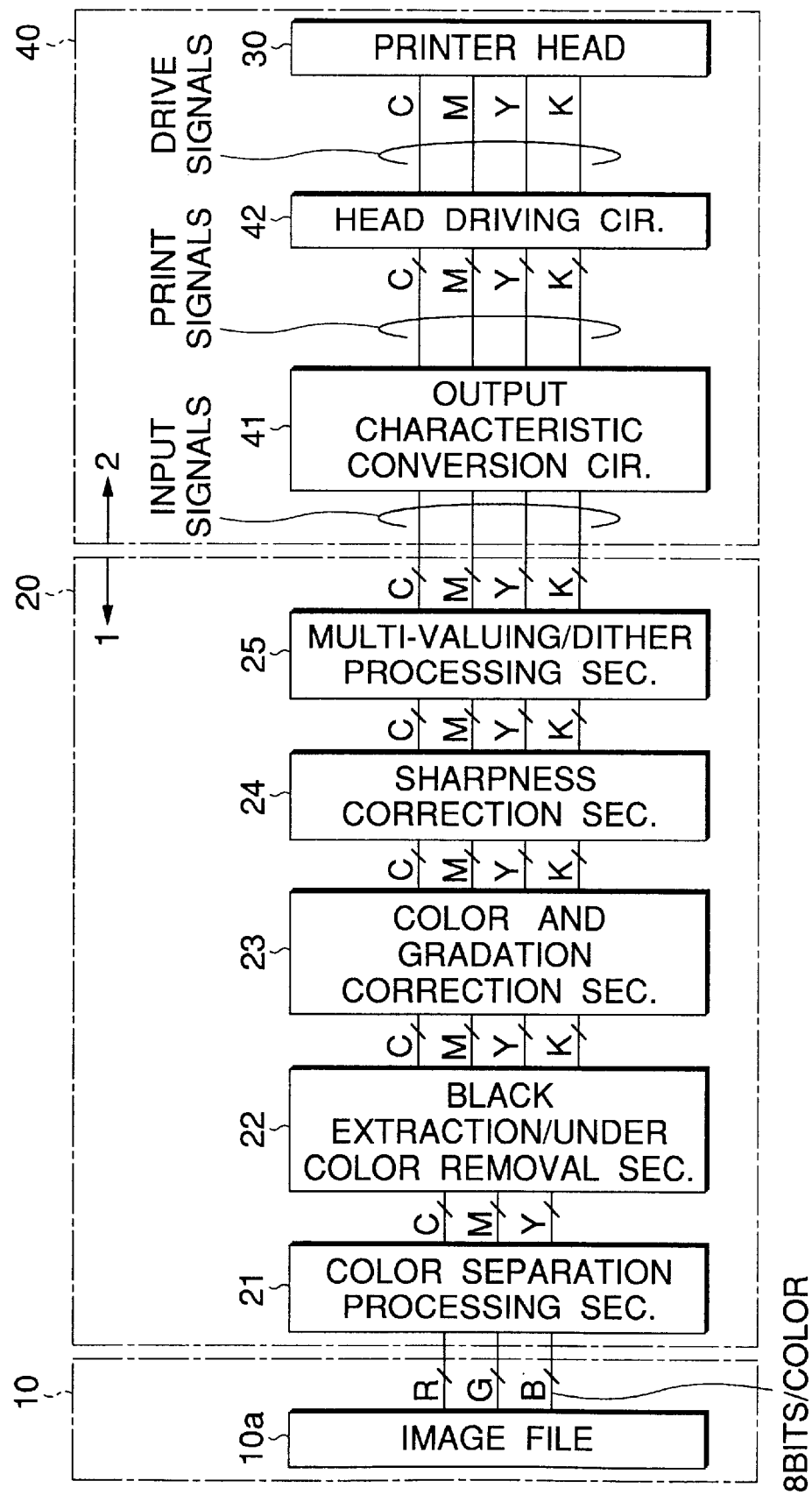
FIG. 3 is a block diagram showing signal processing that is performed by a host computer of the printer apparatus to which the invention is applied.

FIG. 3 is a block diagram showing a configuration of the host computer 20. The host computer 20 is configured by connecting, in the following order, a color separation processing section 21, a black extraction/under color removal section 22, a color and gradation correction section 23, a sharpness correction section 24, and a multi-valuing/dither processing section 25.

The color separation processing section 21 converts R, G, and B signals of an image file 10a that has been read from the image memory 10 into C, M, and Y signals. The R, G, and B signals are 8-bit signals.

For example, where the printer head 30 is provided with a black (K) recording head, the black extraction/under color removal section 22 extracts a black (K) component from the C, M, and Y signals that have been obtained by the color separation processing section 21 through conversion in the above manner, and generates and output new C, M, Y, and K signals.

The color and gradation correction section 23 performs, when necessary, color and gradation correction on the C, M, Y, and K signals that have been generated by the black extraction/under color removal section 22 in the above manner, and outputs corrected C, M, Y, and K signals.

The sharpness correction section 24 performs image sharpening processing such as high-frequency emphasis, MTF correction, and blur correction and noise removal processing such as smoothing and texture removal on the corrected C, M, Y, and K signals that have been obtained by the color and gradation correction section 23 in the above manner.

The multi-valuing/dither processing section 25 performs multi-gradation dither processing of, for instance, a multi-gradation error diffusion method to reproduce gradation levels that cannot be expressed with the maximum dot gradation number of the carrier jet printer 40 on the C, M, Y, and K signals that have been processed by the sharpness correction section 24 is the above manner, and employs resulting signals as signals including information on dots to be printed.

The host computer 20 transfers the signals including dot information that have been obtained by the various kinds of processing described above to the carrier jet printer 40 in synchronism with its actual printing operation.

In the carrier jet printer 40, the output characteristic conversion circuit 41 converts the input signals including dot information that have been input from the host computer 20 so that printing can be performed more effectively, to produce print signals. The head driving circuit 42 converts the print signals that have been obtained by the output characteristic conversion circuit 41 through conversion, into drive signals by performing signal processing on the print signals, and actually drives the printer head 30.

In particular, based on the input/output characteristic of the printer head 30, that is, the relationship between the drive signal that is supplied to the printer head 30 and the print density obtained by the printer head 30, the output characteristic conversion circuit 41 that is used in the invention performs signal conversion so that gradation levels are expressed most effectively based on the print signals. Details of the conversion by the output characteristic conversion circuit 41 will be described later.

Figure 4:
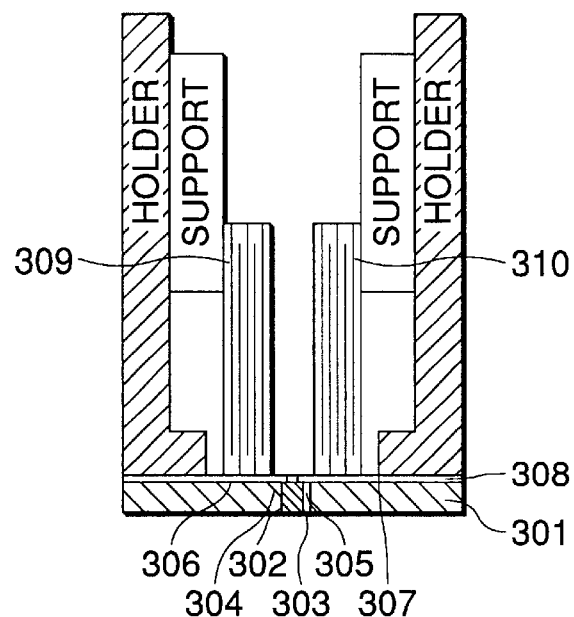
FIG. 4 schematic showing the entire structure of a nozzle jetting mechanism in a printer head of the printer apparatus to which the invention is applied.

Incidentally, in the printer head 30 that is incorporated in an ordinary carrier jet printer, an ink jetting mechanism for jetting ink droplets is configured as shown in FIG. 4.

The printer head 30 performs halftone printing by using an ink liquid that is a mixture of ink whose amount has been measured in accordance with a drive signal and a dilute of a predetermined amount.

Figure 5:
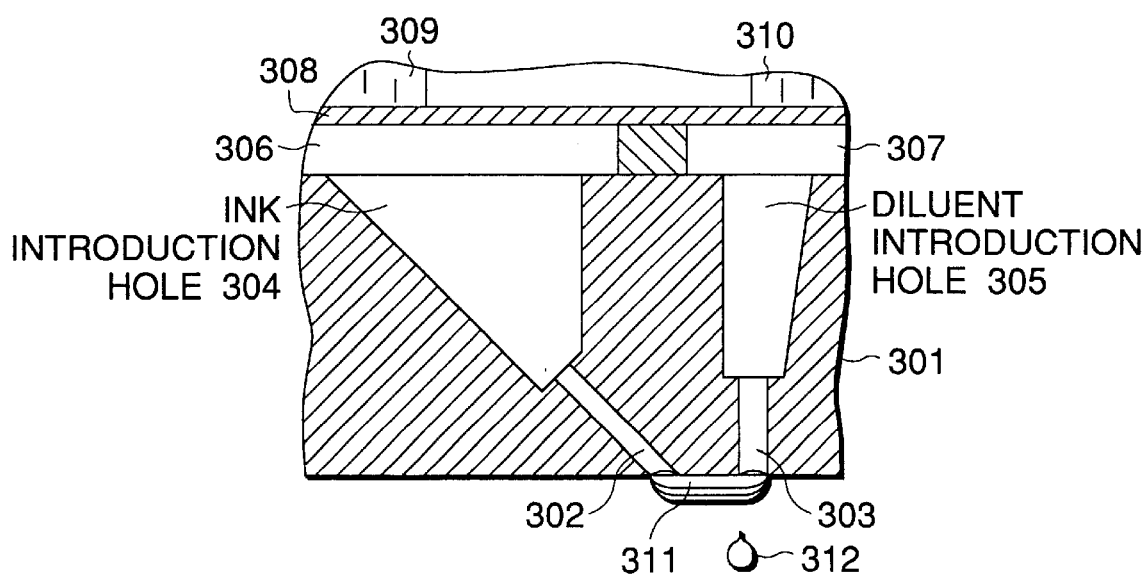
FIG. 5 is a schematic showing the structure of the main part of the nozzle jetting mechanism in the printer head of the printer apparatus to which the invention is applied.

FIG. 4 shows the structure of the entire ink jetting mechanism and FIG. 5 shows the structure of its main part. An orifice plate 301 is provided with a quantifying nozzle 302 and a jetting nozzle 303. An ink introduction hole 304 and a dilute introduction hole 305 are connected to the respective nozzles 302 and 303 from the back side.

The introduction holes 304 and 305 communicate with a quantifying-side cavity 306 and a jetting-side cavity 307, respectively. A vibration plate 308 is provided in the rear of the cavities 306 and 307, and is driven by a quantifying-side piezoelectric element 309 and a jetting-side piezoelectric element 310.

Figure 6A:
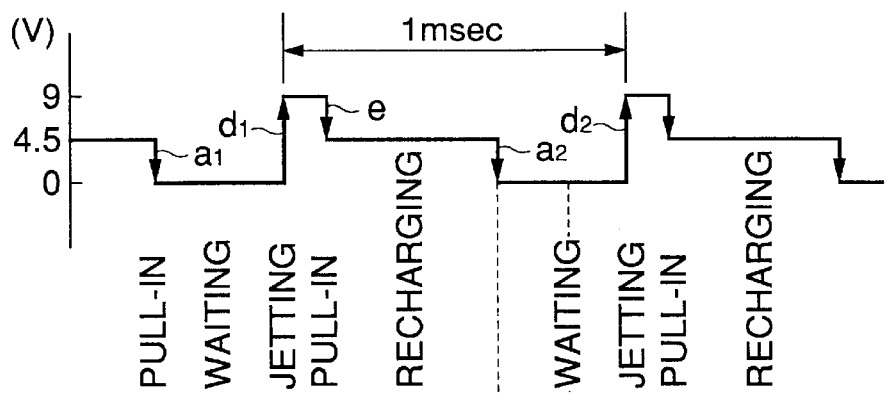
FIGS. 6A and 6B are timing charts showing the application timing of drive voltages to the printer head of the printer apparatus to which the invention is applied.
Figure 6B:
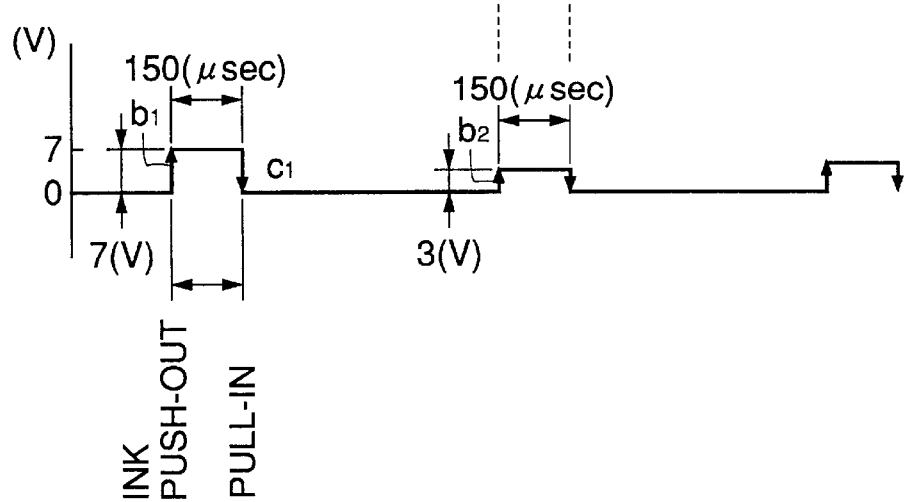

FIGS. 6A and 6B are timing charts showing temporal variations of drive voltages that are applied to the jetting-side piezoelectric element 310 and the quantifying-side piezoelectric element 309, respectively.

Figure 7:
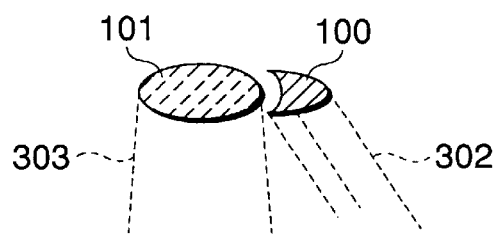
FIG. 7 is a schematic showing ink and a dilute both of which are in a waiting state.

In a period from time $a_1$ to time $d_1$ shown in FIG. 6A, the jetting nozzle 303 is charged with a dilute. In particular, in a period from time $a_1$ to time $b_1$ shown in FIGS. 6A and 6B, ink 100 and a dilute 101 are in a waiting state as shown in FIG. 7.

Then, at time $b_1$ shown in FIG. 6B, the ink 100 is pushed out from the quantifying nozzle 302 toward the opening of the jetting nozzle 303 by increasing the drive voltage for the quantifying-side piezoelectric element 309 to a predetermined value.

Figure 8:
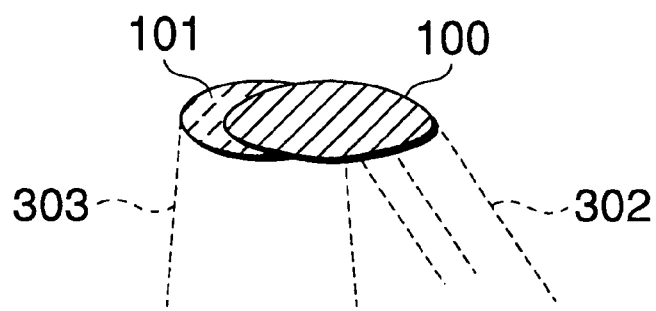
FIG. 8 is a schematic showing a state that ink and a dilute that are in contact with each other.

In a period from time $b_1$ to time $c_1$ shown in FIG. 6B, the ink 100 that has been pushed out from the quantifying nozzle 302 remains over the opening of the jetting nozzle 303 and is mixed with the dilute 101 existing there, as shown in FIG. 8.

At time $c_1$ shown in FIG. 6B, the ink 100 is pulled into the ink introduction hole 304 so that the portion of the ink 100 that is in contact with and is mixed with the dilute 101 is left.

Subsequently, in a period from time $c_1$ to time $b_2$ shown in FIG. 6B, ink 100 is again supplied from the quantifying-side cavity 306 to the ink introduction hole 304.

Figure 9:
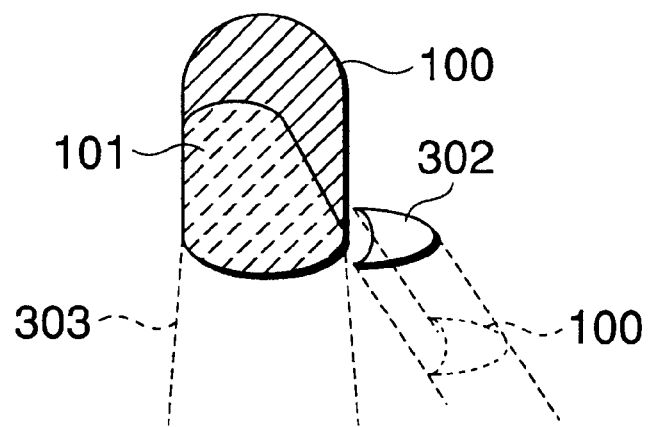
FIG. 9 is a schematic showing how an ink liquid that is a mixture of ink and a dilute is jetted from a jetting nozzle.

At time $d_1$ shown in FIG. 6A, the ink 100 and the dilute 101 that are mixed over the opening of the jetting nozzle 303 are pushed out from over the jetting nozzle 303 as shown in FIG. 9 by increasing the drive voltage for the jetting-side piezoelectric element 310 to a predetermined value.

The mixed liquid of the ink 100 and the dilute 101 thus pushed out is jetted as an ink droplet 312 toward a recording medium and deposited thereon.

In a period from time $d_1$ to time e shown in FIG. 6A, the drive voltage applied to the jetting-side piezoelectric element 310 is kept at the same value. At time e, the dilute 101 is pulled into the dilute introduction hole 305. In a period from time e to time $a_2$ shown in FIG. 6A, a dilute 101 is again supplied from the jetting-side cavity 307 to the dilute introduction hole 305.

The interval from one jetting of the dilute 101 to the next, that is, the interval between time $d_1$ to time $d_2$ shown in FIG. 6A, is set at 1 msec, for instance. In particular, at time $d_1$ shown in FIG. 6A, a drive voltage of 9 V, for instance, is applied to the jetting-side piezoelectric element 310 and a dilute is jetted by a mechanical displacement of the voltage-applied jetting-side piezoelectric element 310.

On the other hand, when the ink 100 is pushed out, that is, at time $b_1$ shown in FIG. 6B, a drive voltage of 7 V, for instance, is applied to the quantifying-side piezoelectric element 309. However, a displacement of the quantifying-side piezoelectric element 309 caused by this voltage is insufficient to jet the ink 100, and the ink 100 is merely pushed out from the quantifying nozzle 302 toward the opening of the jetting nozzle 303 as shown in FIG. 8.

According to the above timing charts, the ink 100 and a dilute 101 are mixed with each other immediately before their jetting and an ink droplet 312 of a resulting ink liquid is jetted from the jetting nozzle 303 onto a recording medium and deposited thereon In particular, by controlling the interval from time $b_1$ to time $c_1$ shown in FIG. 6B and the drive voltage value, the amount of ink to be pushed out can be adjusted whereby the ink density of a jetted ink droplet 312 can be controlled arbitrarily. For example, if the interval from time $b_1$ to time $c_1$ shown in FIG. 6B is set at 150 µsec and drive voltages at time $b_1$ and time $b_2$ are set at 7 V and 3 V, respectively, ink liquid densities at time $b_1$ and time $b_2$ are different from each other. Printing at a desired halftone level can be performed in this manner.

Next, a description will be made of the relationship between the drive voltage applied to the quantifying-side piezoelectric element 309 (that is, the quantifying-side drive voltage, and the average reflection density on a recording medium on which an ink droplet 312 is deposited when an ordinary carrier jet printer is actually driven. The following measurement was conducted to determine the relationship between the quantifying-side drive voltage and the average reflection density. A result is shown in Table 1.

As for the measuring method, as shown in Table 1, input signal Nos. 0 to 255 were divided every 16 signals and the respective groups were represented by input signal Nos. 0, 15, 31, and so forth, teat is, input signal sample Nos. 1, 2, 3, and so forth. Input signal sample Nos. 1–17 were finally obtained. Quantifying-side drive voltage values that would provide a relationship between the quantifying-side drive voltage and the average reflection density on a recording medium most properly were determined by conducting experiments repeatedly, and were used actually. Average reflection density values on a recording medium at those quantifying-side drive voltage values were actually measured.

TABLE 1

| Input signal sample No. | Input signal | Quantifying-side drive voltage [V] | Average reflection density [O.D] |
|---|---|---|---|
| 1 | 0 | 0.00 | 0.08 |
| 2 | 15 | 0.27 | 0.22 |
| 3 | 31 | 0.72 | 0.54 |
| 4 | 47 | 1.17 | 0.78 |
| 5 | 63 | 1.62 | 0.96 |
| 6 | 79 | 2.07 | 1.13 |
| 7 | 95 | 2.52 | 1.26 |
| 8 | 111 | 2.96 | 1.37 |
| 9 | 127 | 3.41 | 1.46 |
| 10 | 143 | 3.86 | 1.55 |
| 11 | 159 | 4.31 | 1.61 |
| 12 | 175 | 4.76 | 1.68 |
| 13 | 191 | 5.21 | 1.71 |
| 14 | 207 | 5.65 | 1.75 |
| 15 | 223 | 6.10 | 1.77 |
| 16 | 239 | 6.55 | 1.79 |
| 17 | 255 | 7.00 | 1.80 |

*) Including the reflection density of a recording sheet.

Figure 10:
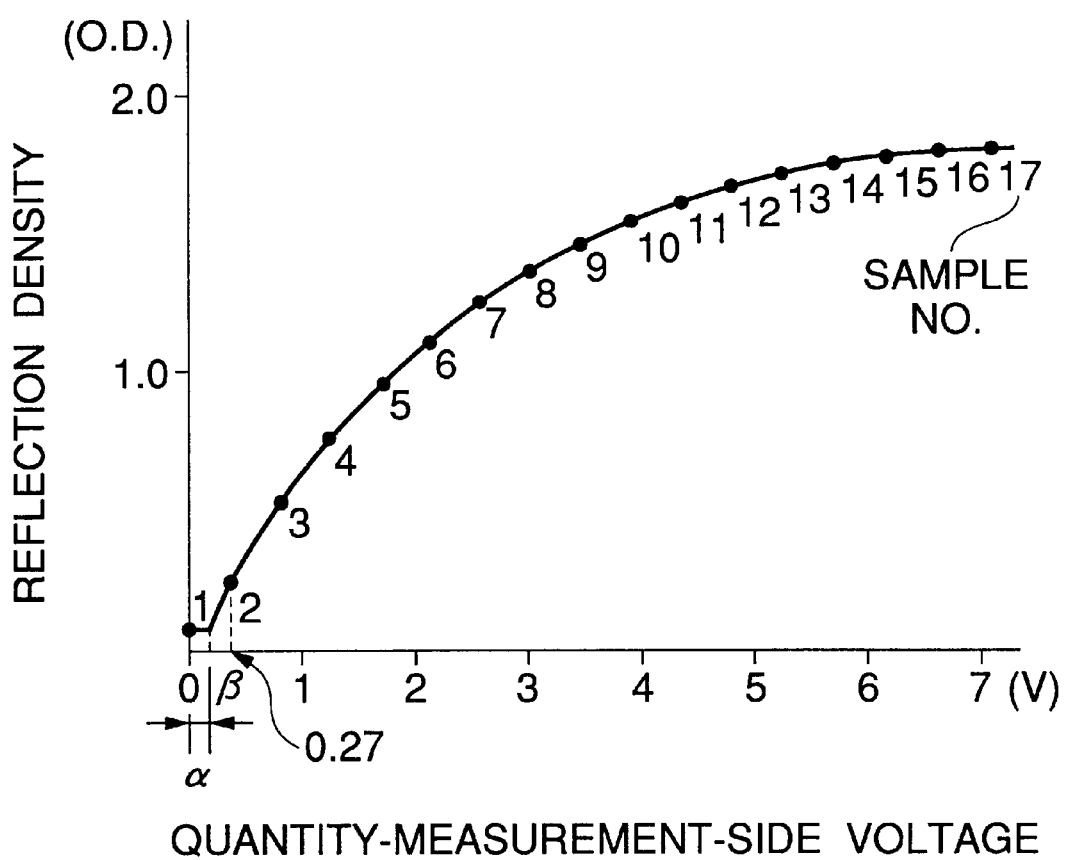
FIG. 10 is a graph showing a relationship between the quantifying-side drive voltage and the reflection density on a recording medium.
Figure 11:
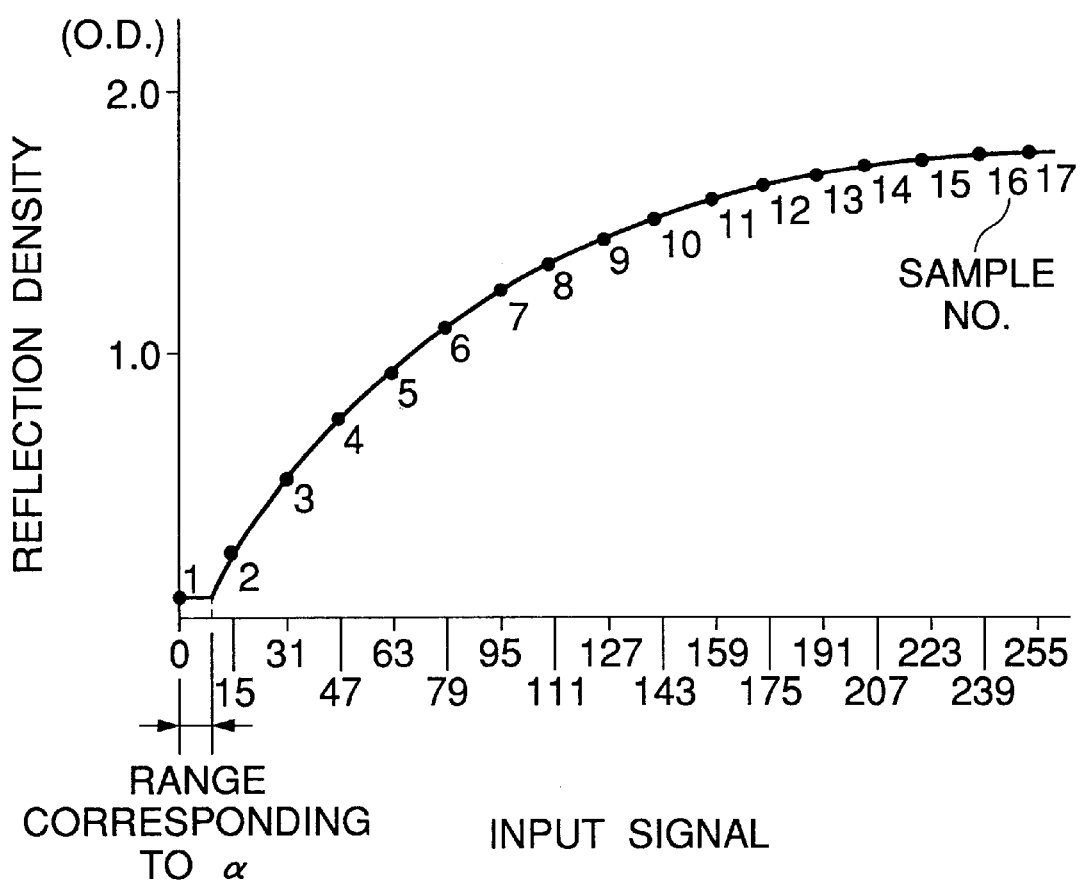
FIG. 11 is a graph showing a relationship between the input signal and the reflection density on a recording medium.

FIG. 10 is a graph plotting the relationship of Table 1 in which the horizontal axis represents the quantifying-side voltage and the vertical axis represents the average reflection density. FIG. 11 is a graph plotting the relationship of Table 1 in which the horizontal axis represents the input signal and the vertical axis represents the average reflection density.

As seen from Table 1 and FIGS. 10 and 11, the point of the input signal sample No. 1 is not located on the curve determined by the average reflection densities of the other input signal samples. That is, it has been found that the quantifying mixing operation of ink, that is, the operation that ink is pushed out from the quantifying nozzle 302 and mixed with a dilute, starts only after the quantifying-side drive voltage exceeds a certain minimum necessary value rather than from 0 V.

It is considered,,that this phenomenon occurs in the following manner. Where the amount of ink pushed out from the quantifying nozzle 302, the ink cannot reach the vicinity of the opening of the jetting nozzle 303. As a result, when a dilute is jetted from the jetting nozzle 303, the ink is not brought into contact with and mixed with the dilute and only the dilute is jetted; an ink liquid is not jetted.

If the phenomenon occurs that only a dilute is jetted and an ink liquid is not jetted, it is difficult to correctly reproduce a subtle hue variation. For example, in a range a in FIG. 10 where the quantifying-side drive voltage is very low, that is, in the range of input signal Nos. 0–15, even if the quantifying-side drive voltage is applied, an ink liquid is not jetted and printing on a recording medium is not effected because ink is not brought into contact with and mixed with a dilute. The reason why the reflection density is not 0 when the quantifying-side drive voltage is 0 V in FIG. 10 or the input signal No. is 0 in FIG. 11 is that the reflection density of a recording medium itself is still measured.

To avoid the above phenomenon that is found in the ordinary carrier jet printer the output characteristic conversion circuit 41 is provided in the carrier jet printer 40 to which the invention is applied. The output characteristic conversion circuit 41 converts input signals including dot information that are input from the outside so that the quantifying-side drive voltage can be used most effectively, to enable correct halftone expression.

That is, the output characteristic conversion circuit 41 that is used in the invention converts received input signals including dot information into print signals so that the printer head 30 can mix ink 100 into a dilute 101 even when printing is performed based on an input signal including dot information of the lowest density which is below the threshold density determined by the printer head.

By using the above output characteristic conversion circuit 41, the printer head 30 can mix ink 100 into a dilute 101 even when printing is performed based on an input signal including dot information of the lowest density. Therefore, there can be avoided the phenomenon of the conventional apparatus that when a desired density is low, ink 100 is not mixed with a dilute 101 and only the dilute 101 is jetted, that is, an ink liquid is not jetted.

The conversion performed by the output characteristic conversion circuit 41 will be described below in detail with attention paid to the quantifying-side voltage.

Specifically, it is intended to convert an input signal that has been input from the outside to the carrier jet printer 40 into a print signal so that it is output as corresponding to a drive voltage that is higher than a minimum necessary voltage $\beta$ (see FIG. 10) for directly contributing to printing, that is, without using the drive voltage range lower than $\beta$ that does not contribute to printing on a recording medium.

Figure 12:
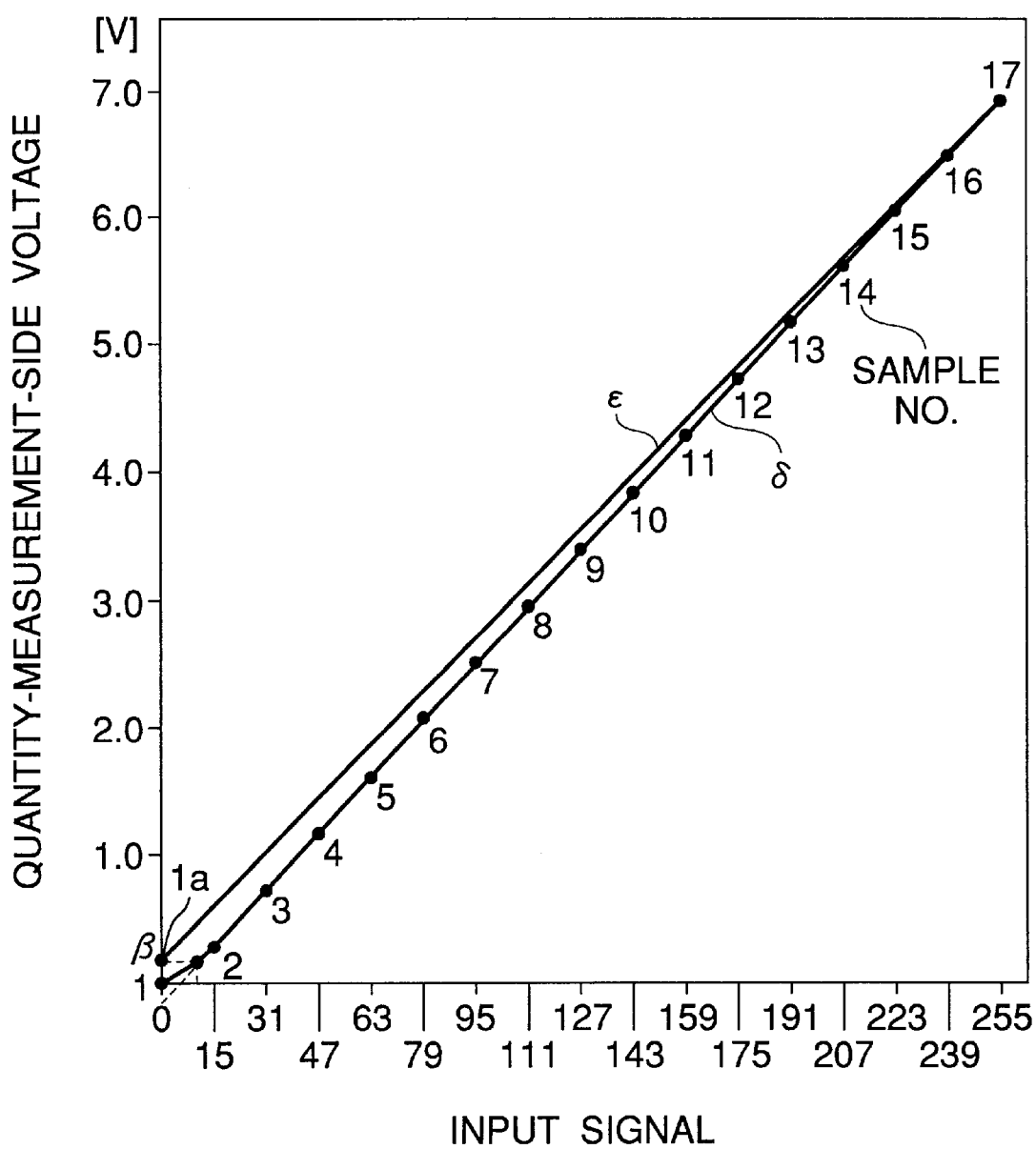
FIG. 12 is a graph showing a relationship between the input signal and the quantifying-side drive voltage.

This can be explained as follows by using FIG. 12 plotting the relationship of Table 1 in which the horizontal axis represents the input signal and the vertical axis represents the quantifying-side drive voltage. In a curve $\delta$ of the conventional printer head, the input signal and the quantifying-side drive voltage does not have a linear relationship in the drive voltage range of 0 to $\beta$.

On the other hand, in the output characteristic conversion circuit 41 that is used in the invention, an input signal is converted into a print signal corresponding to a drive voltage higher than the minimum necessary voltage $\beta$. Therefore, the output characteristic conversion circuit 41 provides a straight line $\epsilon$ rather than the folded line $\delta$ of the conventional printer head.

As a result, the quantifying-side drive voltage can be used most effectively. Further, since this linear relationship facilitates the control to obtain a desired gradation level through a quantifying-side drive voltage, halftone expression can be performed with higher accuracy.

The above conversion can also be explained in the following manner with reference to FIG. 13 with attention paid to the relationship between the input signal and the converted print signal.

Figure 13:
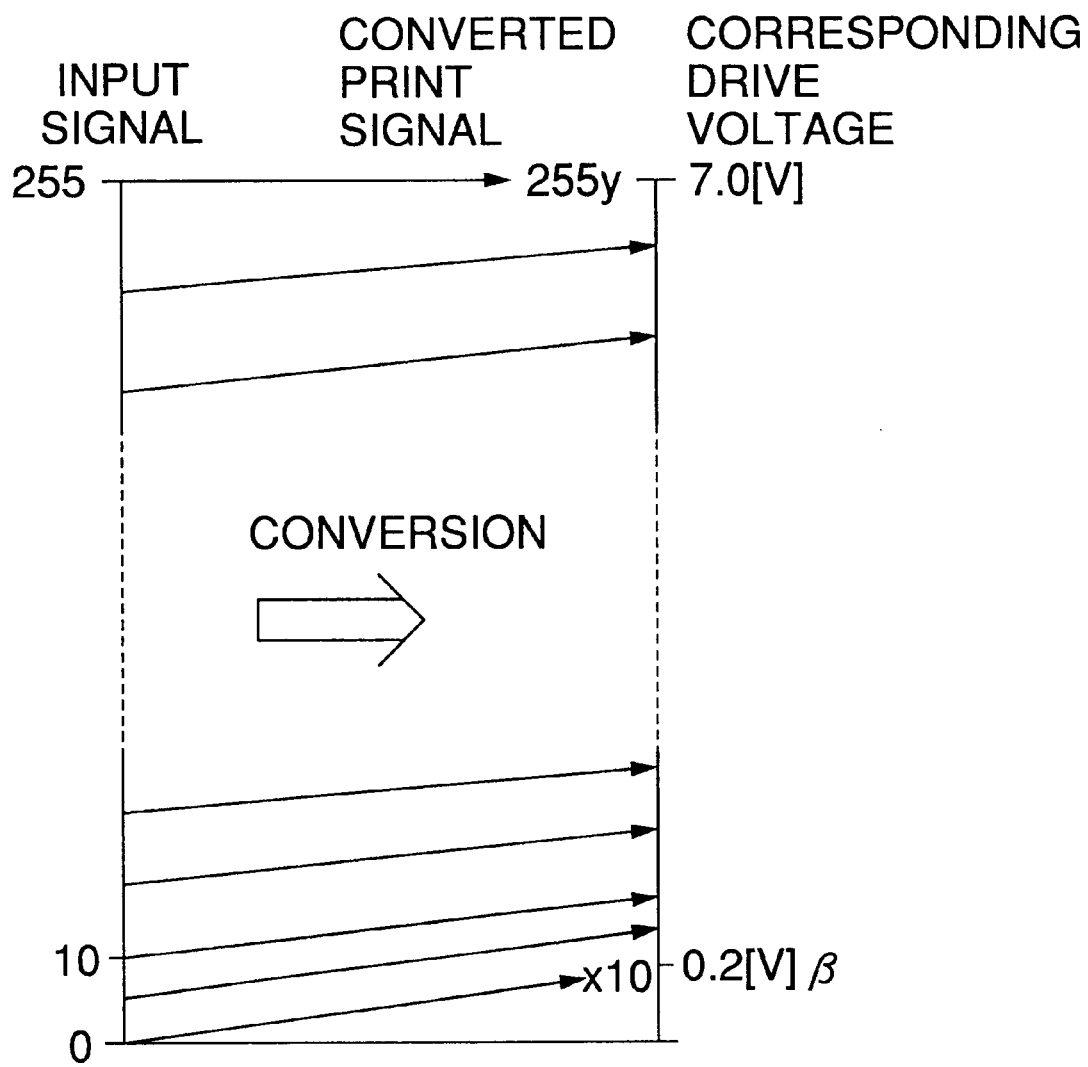
FIG. 13 schematically shows a relationship among the input signal, the converted signal, and the quantifying-side drive voltage in the conversion of a converting means in a case where multi-gradation dithering is not used.

The conversion of the output characteristic conversion circuit 41 is such that the relationship between the input signal including information on dots to be printed that is input from the outside and the converted print signal and the relationship between those signals and the quantifying-side drive voltage are as shown in FIG. 13.

For example, as shown in FIG. 13, where the input signal that is input from the outside has 256 gradation levels of 0–255 and a print signal to be output as corresponding to the minimum necessary voltage $\beta$ is level 10 among 0–255, the portion of level 10 or less of the input signal levels 0–255 is converted into a portion of level 10 or more of the print signal levels 0–255. Accordingly, the other portion of the input signal levels is converted into a portion in a range 10–255 of the print signal levels 0–255 The converted print signal is not necessarily divided equally in the above range. FIG. 13 is of a case in which multi-gradation dithering is not used.

Examples of factors relating to the phenomenon that ink does not start to be pushed out from the point where the quantifying-side drive voltage is 0 V in the ordinary carrier jet printer are the shape of the quantifying nozzle 302, the angle of the quantifying nozzle 302 with respect to the orifice plate 301, the shape of the jetting nozzle 303, the distance between the quantifying nozzle 302 and the jetting nozzle 303, surface properties of the portion of the orifice plate 301 between the quantifying nozzle 302 and the jetting nozzle 303, physical properties such as viscosity, surface tension, and easiness of mixing of the ink and the dilute, the timing of pushing out ink, and the timing of jetting a dilute. Therefore, it is necessary to determine the manner of conversion of the converting means in advance by performing experiments or simulations.

Figure 14:
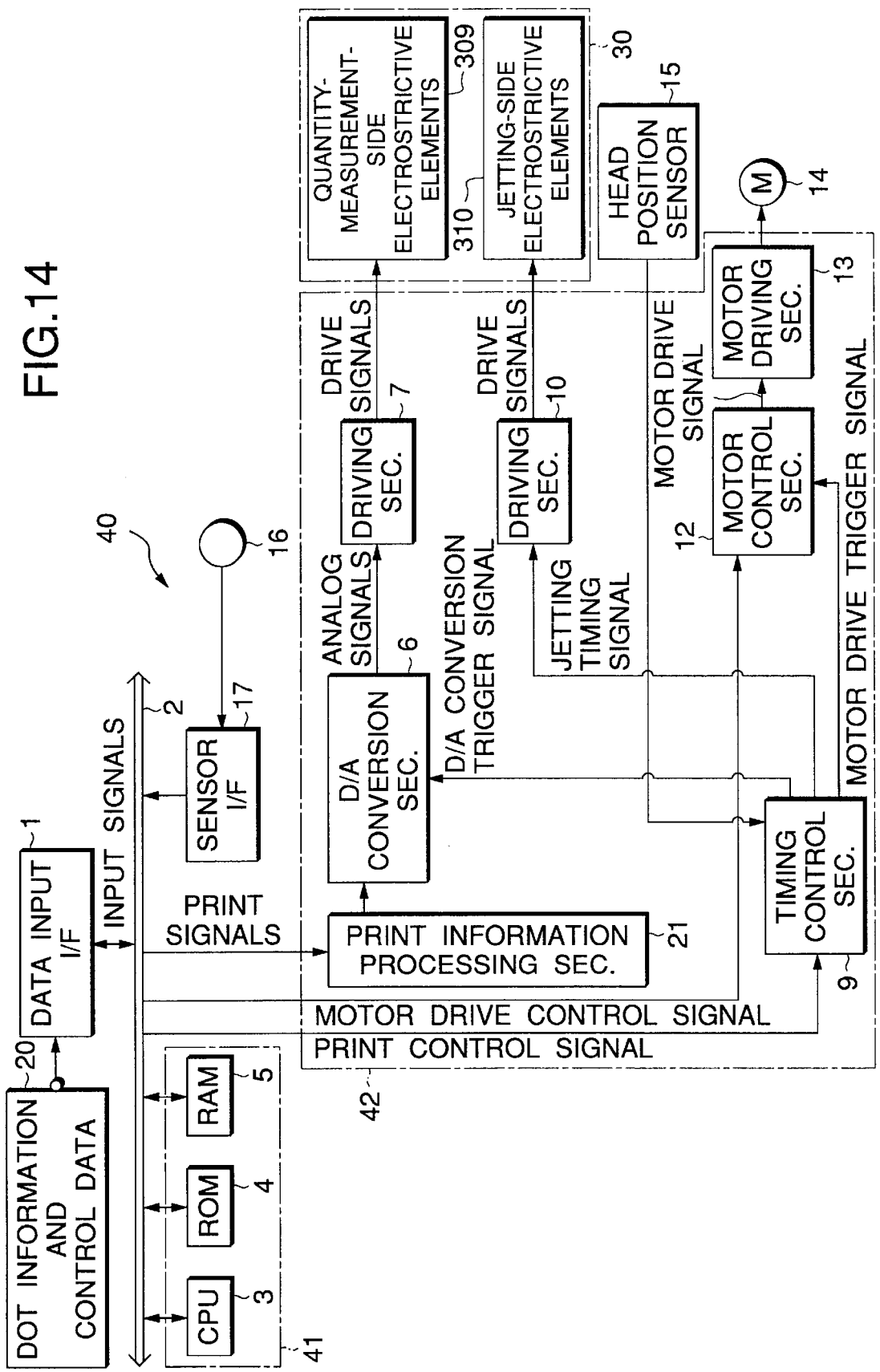
FIG. 14 is a block diagram showing an example of configuration of a control system of a carrier jet printer.

Next, a description will be made of the configuration of a control system of the carrier jet printer 40 having the above-described printer head 30. FIG. 14 is a block diagram showing a configuration of a control system of the carrier jet printer 40.

The control system of the carrier jet printer 40 includes a data input interface 1 that is connected to a system bus 2, the output characteristic conversion circuit 41 that is composed of a CPU 3, a ROM (read-only memory) 4, and a RAM 5 and that receives input signals from the host computer 20, a sensor interface 17 that connects a temperature sensor 16 to the system bus 2, the head driving circuit 42 that is supplied with print signals from the output characteristic conversion circuit 41, and the printer head 30 having the piezoelectric elements 309 and 310 to which drive voltages age applied based on drive signals that are supplied from the head driving circuit 42.

A head position sensor 15 and a sheet feed motor/head feed motor 14 are connected to the head driving circuit 42.

The head driving circuit 42 includes a print information processing section 21, a D/A conversion section 6, a timing control section 9, a motor control section 12, a motor driving section 13, and driving sections 7 and 10. The quantifying-side piezoelectric elements 309 are connected to the driving section 7 and the jetting-side piezoelectric elements 310 are connected to the driving section 10.

The quantifying-side piezoelectric elements 309 and the jetting-side piezoelectric elements 310 are provided on the printer head 30.

The data input interface 1 connects the host computer 20 and the output characteristic conversion circuit 41 including the CPU 3. The data input interface 1 supplies the system bus 2 with input signals including information on dots to be printed and control signals that are sent from the host computer 20. Examples of the data input interface 1 are parallel interfaces such as bi-Centronics and SCSI-2 and serial interfaces such as RS-232C and RS-422.

The CPU 3 that is provided in the output characteristic conversion circuit 41 supplies input signals that are sent from the host computer 20 via the data input interface 1 to the head driving circuit 42 via the system bus 2. At this time, the CPU 3 converts, in a manner described later, the input signals into print signals by referring to a conversion table that is stored in the ROM 4 or the RAM 5 of the output characteristic conversion circuit 41, and supplies the print signals to the head driving circuit 42.

Further, according to control programs stored in the ROM 4, the CPU 3 supplies a print control signal and a motor drive control signal to the timing control section 9 and the motor control section 12, respectively. In this manner, in driving the nozzles 302 and 303 of the printer head 30 for each scan according to a print process, the CPU 3 controls both of line-by-line mixing and jetting operations of each nozzle of the carrier jet printer 40.

The ROM 4 stores control programs and data that are necessary for the processing of the CPU 3. As described later, the ROM 4 may store a conversion table that shows the relationship between the input signal and the print signal.

The RAM 5 has an area for temporarily storing signals that are read out from the ROM 4 and is rewritable. As described later, the RAM 5 may store a conversion table that shows the relationship between the input signal and the print signal.

The print information processing section 21 is connected to the output characteristic conversion circuit 41 via the system bus 2. The print information processing section 21 is also connected to the D/A conversion section 6. The print information processing section 21 receives print signals that have been subjected to the conversion of the output characteristic conversion circuit 41, performs signal processing on the received print signals, and supplies resulting print signals to the D/A conversion section 6.

The D/A conversion section 6 is connected to the print information processing section 21 to which print signals are input from the output characteristic conversion circuit 41. The D/A conversion section 6 is also connected to the driving section 7 and the timing control section 9. The D/A conversion section 6 converts print signals that are supplied from the print information processing section 21 into analog signals and supplies the analog signals to the driving section 7.

The driving section 7 is connected to the D/A conversion section 6 and the quantifying-side piezoelectric elements 309. The driving section 7 receives the analog signals that have been produced by the D/A conversion section 6 through conversion. The driving section 7 performs signal processing on the received analog signals and supplies resulting drive signals to the quantifying-side piezoelectric elements 309.

The quantifying-side piezoelectric elements 309 of the printer head 30 receives the above drive signals and the amount of ink is measured in accordance with the received drive signals.

The timing control section 9 is connected to the head position sensor 15, the motor control section 12, the D/A conversion section 6, and the driving section 10. The timing control section 9 receives a position detection signal and a print control signal that are output from the head position sensor 15 and the CPU 3 of the output characteristic conversion circuit 41, respectively. At this time, the timing control section 9 detects the position of the printer head 30 based on the position detection signal.

The timing control section 9 supplies a motor drive trigger signal, a D/A conversion trigger signal, and a timing signal to the motor control section 12, the D/A conversion section 6, and the driving section 10, respectively.

The driving section 10, which is connected to the jetting-side piezoelectric elements 310, performs signal processing on the timing signal and supplies drive signals to the jetting-side piezoelectric elements 310.

Receiving the drive signals, the jetting-side piezoelectric elements 310 in the printer head 30 jet dilutes based on the drive signals.

The motor control section 12 is connected to the CPU 3 via the system bus 2, and is also connected to the timing control section 9 and the motor driving section 13. Receiving a motor drive control signal from the CPU 3 via the system bus 2 and a motor drive trigger signal from the timing control section 9, the motor control section 12 supplies a motor drive signal to the motor driving section 13.

The motor driving section 13 drives the sheet feed/head heed motor 14 connected thereto.

The temperature sensor 16 that is provided in the vicinity of the nozzles of the printer head 30 is connected to the sensor interface 17.

Although to simplify the description the head driving circuit 42 of FIG. 14 is shown as if to have the configuration for driving only one nozzle, actually the D/A conversion section 6, the driving sections 7 and 10, the quantifying-side piezoelectric element 309, and the jetting-side piezoelectric elements 310 are provided in a number corresponding to the number of nozzles.

The quantifying-side piezoelectric elements 309 and the jetting-side piezoelectric elements 310 are driven while receiving drive voltages that are produced based on the drive signals that are output from the driving sections 7 and 10, and the amount of ink is measured in accordance with each drive signal and a predetermined amount of dilution is jetted.

The sheet feed/head feed motor 14 is driven based on the motor drive signal that is supplied via the motor control section 12 and the motor driving section 13 and that has been produced based on the motor drive control signal supplied from the CPU 3.

In the above-configured control system of the carrier jet printer 40, signals are read out and signal processing is performed in the following manner. First, as for signals directly relating to printing, input signals including dot information that have been input from the host computer 20 via the data input interface 1 are converted by the output characteristic conversion circuit 41 into print signals, which are supplied to the head driving circuit 42.

The print signals that have been input to the head driving circuit 42 are then input to the print information processing section 21, where they are subjected to signal processing. The print signals are then output from the print information processing section 21 and supplied to the D/A conversion section 6.

Then, the print signals that have been input to the D/A conversion section 6 and a D/A conversion trigger signal produced by the timing control section 9 by performing signal processing on a print control signal that is supplied from the CPU 3 are converted by the D/A conversion section 6 into analog signals, which are supplied to the driving section 7. Finally, drive signals are produced by the driving section 7 by performing signal processing on the analog signals, and are supplied to the quantifying-side piezoelectric elements 309.

Drive voltages are applied to the quantifying-side piezoelectric elements 309 based on the drive signals that have been input thereto in the above manner, and the amount of ink is measured.

On the other hand, drive signals are produced by the driving section 10 by performing signal processing on a jetting timing signal that is supplied from the timing control section 9, and are output to the jetting-side piezoelectric elements 310.

Drive voltages are applied to the jetting-side piezoelectric elements 310 based on the drive signals that have been input thereto in the above manner, and dilutes are jetted.

As for a signal relating to the sheet feed/head feed motor 14, a position detection signal that has been input from the head position sensor 15 is supplied to the timing control section 9. The timing control section 9 supplies a motor drive trigger signal to the motor control section 12.

A motor drive control signal that has been input from the CPU 3 is also supplied to the motor control section 12. A motor drive signal is supplied from the motor control section 12 to the motor driving section 13, then to the sheet feed/head feed motor 14.

The sheet feed/head feed motor 14 is driven based on the motor drive signal that has been input to the motor driving section 13 in the above manner.

The configuration and the conversion processing of the converting means that is provided in the carrier jet printer 40 having the above-configured control system will be described below in detail.

Figure 15:
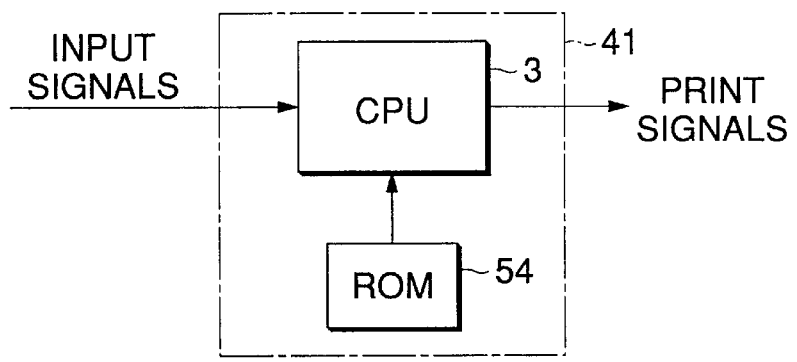
FIG. 15 is a schematic showing an example of configuration of an output characteristic conversion circuit used in the invention.

As shown in FIG. 15, the output characteristic conversion circuit 41 that is used in the invention has the CPU 3 and a ROM 54. As for the conversion method of the output characteristic conversion circuit 41, first, a conversion table for performing conversion according to the output characteristic shown in FIG. 13 is input in advance to the ROM 54 in the carrier jet printer 40.

The CPU 3 converts printing-related input signals that are input from the host computer 20 into print signals by referring to the conversion table in the ROM 54, and supplies the print signals to the head driving circuit 42. The ROM 54 may be part of the ROM 4.

Figure 16:
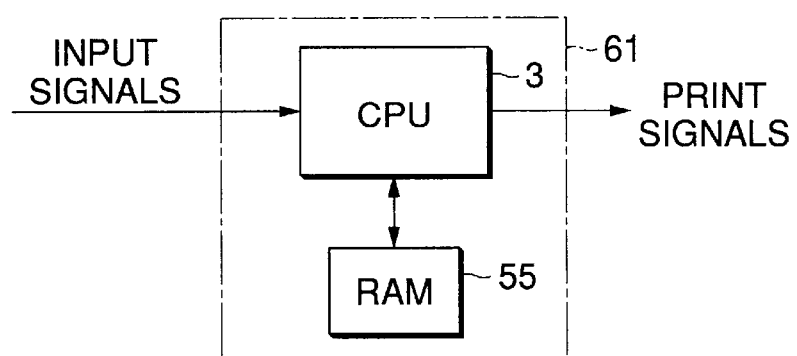
FIG. 16 a schematic showing another example of configuration of the output characteristic conversion circuit used in the invention.

Alternatively, an output, characteristic conversion circuit 61 may be provided in the carrier jet printer 40, and may be composed of the CPU 3 and a RAM 55 as shown in FIG. 16.

As for the conversion method of the output characteristic conversion circuit 61, first, a conversion table for performing conversion according to the output characteristic shown in FIG. 13 is input in advance to the RAM 55 in the carrier jet printer 40.

The CPU 3 converts input signals including information on dots to be printed that are input from the host computer 20 into print signals by referring to the conversion table in the RAM 55, and supplies the print signals to the head driving circuit 42. The RAM 55 may be part of the RAM 5.

In this case, it is preferable that the conversion table in the RAM 55 be controlled in accordance with environmental conditions such as the temperature and the humidity around the printer head 30 and the carrier jet printer 40, printing mode conditions such as selection between a high image quality mode and a draft mode and the kind of recording sheet, and other conditions.

Figure 17:
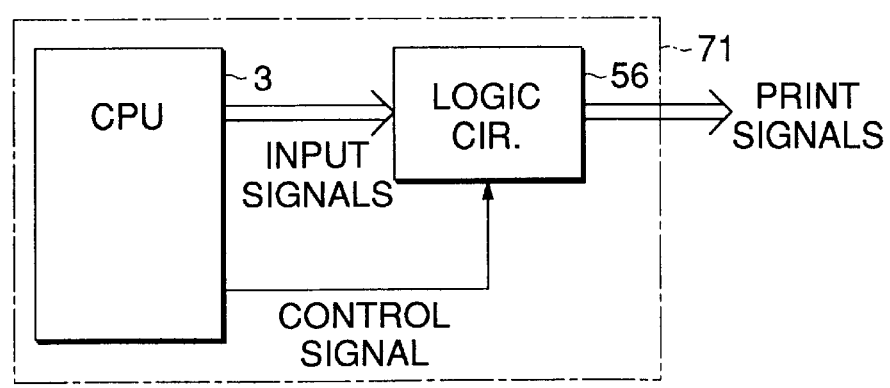
FIG. 17 is a schematic showing a further example of configuration of the output characteristic conversion circuit used in the invention.

As another alternative, an output characteristic conversion circuit 71 may be provided in the carrier jet printer 40, and may be composed of the CPU 3 and a logic circuit 56 as shown in FIG. 17. The conversion of the output characteristic conversion circuit 71 is performed by the logic circuit 56 that is a combination of logic elements etc. rather than by referring to a conversion table as in the cases of FIGS. 15 and 16.

As for the conversion method of the output characteristic conversion circuit 71, when input signals are input from the host, computer 20 via the CPU 3, the logic circuit 56 converts the input signals into print signals, which are supplied to the head driving circuit 42.

In particular, this type of conversion method can easily be implemented by incorporating it in a dedicated integrated circuit such as a programmable logic array (PLA), a gate array, or a standard cell. A configuration is possible in which plural patterns of conversion methods are prepared in the logic circuit 56 and the CPU 3 selects one of those that is suitable for printing conditions etc. based on a control signal.

Figure 18:
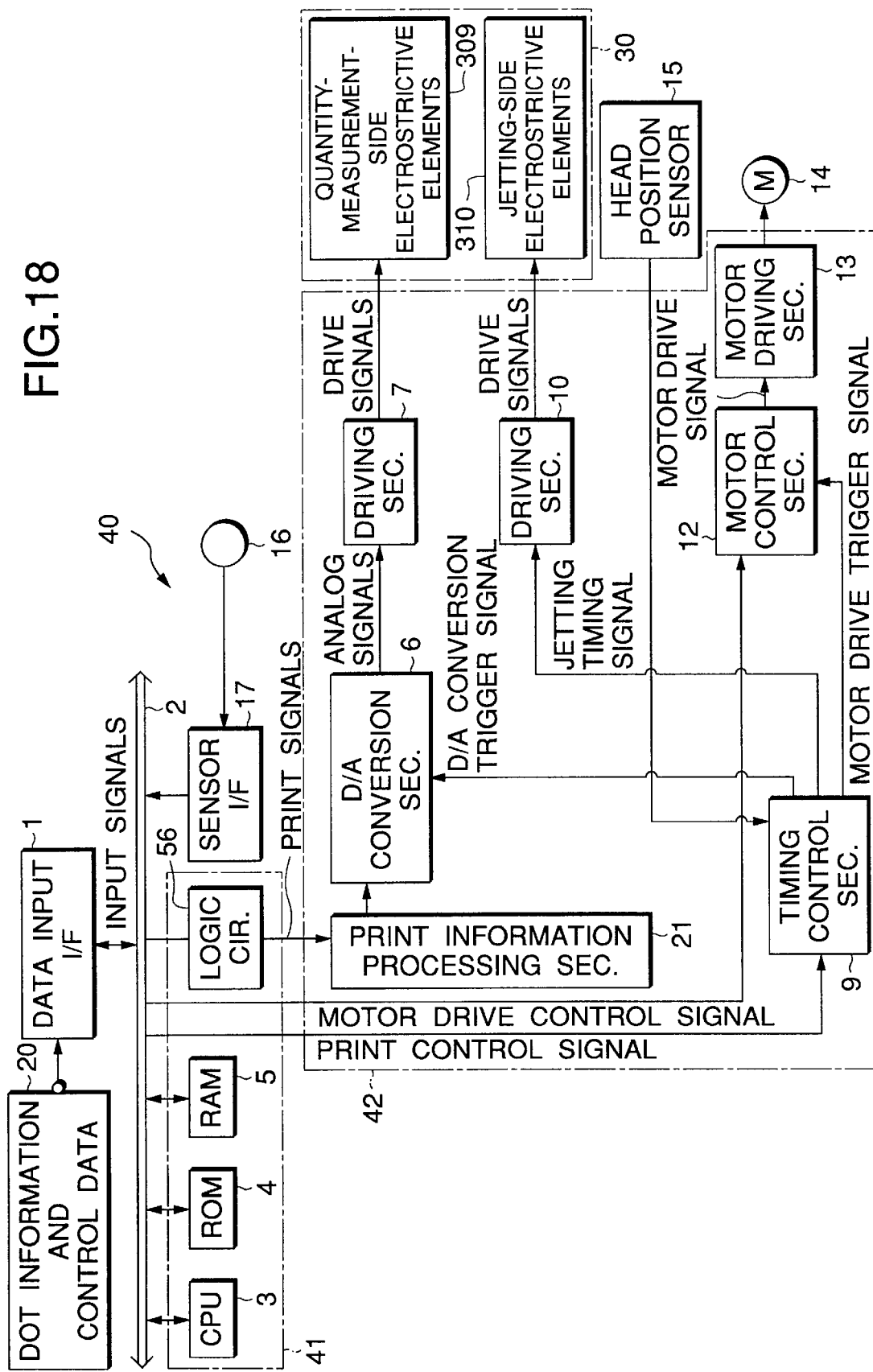
FIG. 18 is a block diagram showing an example of configuration of a control system of a carrier jet printer having the output characteristic conversion circuit of FIG. 17.

It is preferable that the logic circuit 56 be provided at a relay position between the system bus 2 and the head driving circuit 42 as shown in FIG. 18.

Figure 19:
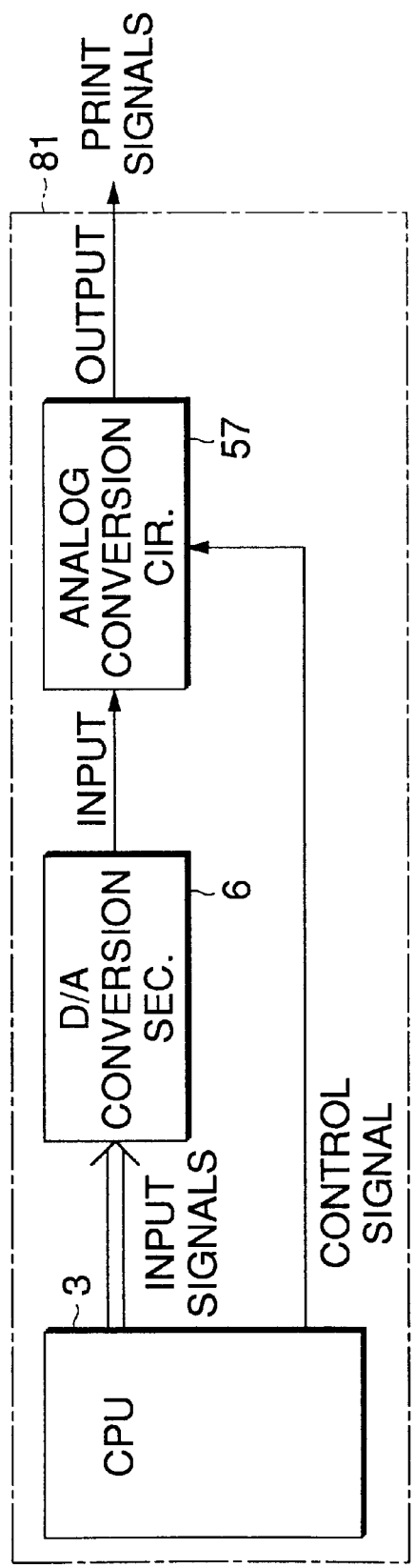
FIG. 19 is a schematic showing still another example of configuration of the output characteristic conversion circuit used in the invention.

As a further alternative, an output characteristic conversion circuit 81 may be provided in the carrier jet printer 40, and may be composed of the CPU 3, the D/A conversion section 6, and an analog conversion circuit 57 as shown in FIG. 19. In the output characteristic conversion circuit 81, the analog conversion circuit 57 having a nonlinear conversion function is provided rather than a conversion table is used as in the cases of FIGS. 15 and 16.

As for the conversion method of the output characteristic conversion circuit 81, first, input signals are input from the host computer 20 to the D/A conversion circuit 6 via the CPU 3 and the D/A conversion circuit 6 converts the digital signals into analog signals. The analog conversion circuit 57 converts, according to the above-described output characteristic, the analog signals into print signals, which are supplied to the head driving circuit 42 and finally output therefrom.

A configuration is possible in which plural patterns of conversion methods are prepared in the analog conversion circuit 57 and the CPU 3 selects one of those that is suitable for printing conditions etc. based on a control signal.

Figure 20:
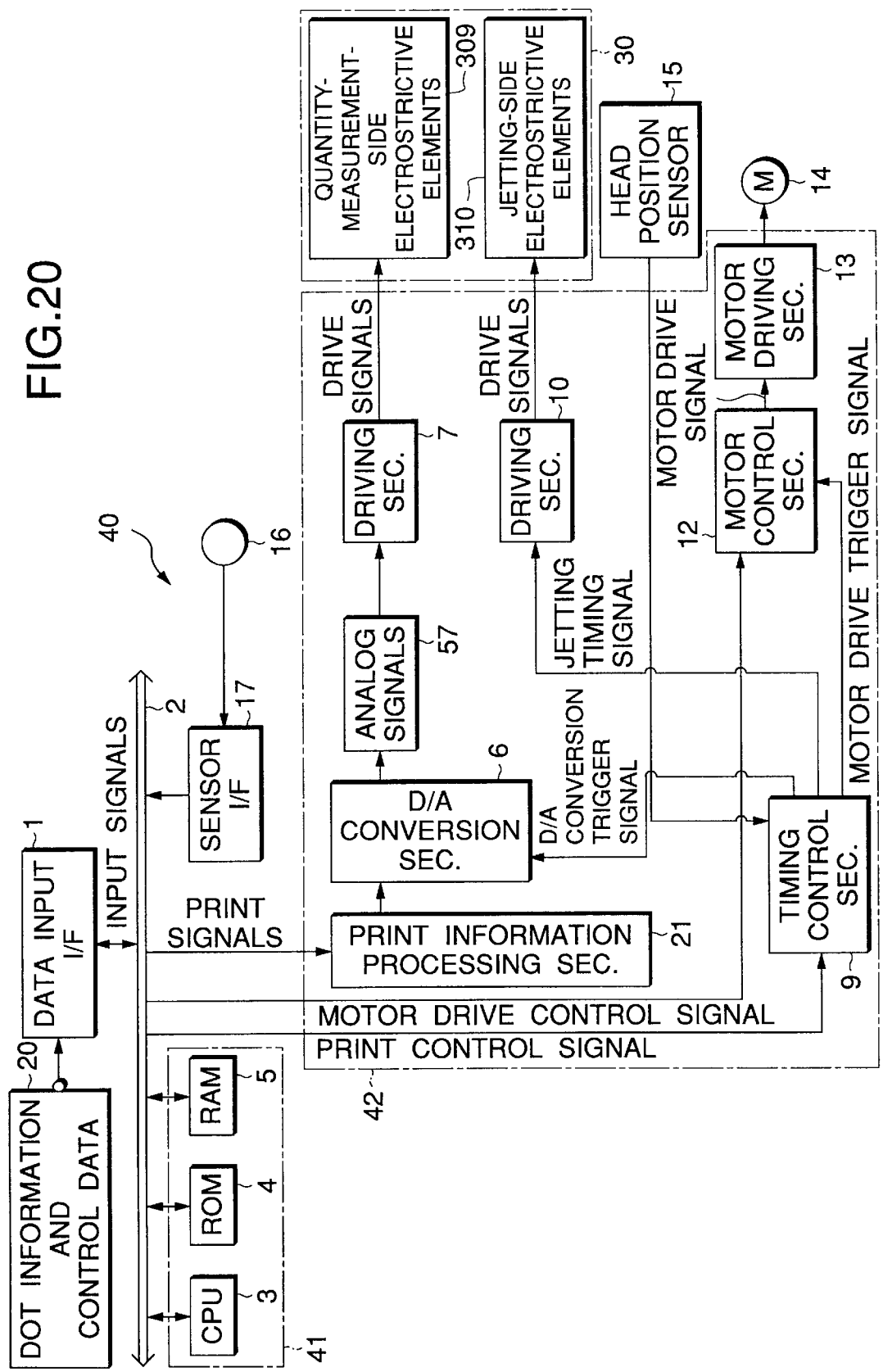
FIG. 20 is a block diagram showing an example of configuration of a control system of a carrier jet printer having the output characteristic conversion circuit of FIG. 19.

It is preferable that the analog conversion circuit 57 for performing the output characteristic conversion be provided at a relay position between the D/A conversion section 6 in the head driving circuit 42 and the driving section 7 as shown in FIG. 20.

Further, the output characteristic conversion circuit may be provided in the host computer 20 and may operate as software in the host computer 20 as shown in FIG. 2 rather than provided in the carrier jet printer 40 as in the cases of FIGS. 15, 16, 17 and 19.

In this case, the output characteristic conversion circuit performs the above-described conversion processing in such a manner that it is added to the processing of a printer driver, and transfers resulting signals to the carrier jet printer 40. The conversion method of this output characteristic conversion circuit enables cost reduction because no additional circuit is needed in the carrier jet printer 40. In the output characteristic conversion processing in the printer driver may use a conversion-table-based technique or a calculation-based technique.

A configuration is possible in which a plurality of converting means are provided in the printer driver and one of those converting means suitable for printing image conditions is selected. Another configuration is possible in which instead of this type of selection, a user selects a converting means freely on a printer setting picture.

Where the interface between the host computer 20 and the carrier jet printer 40 is of a type capable of bi-directional communication such as bi-Centronics, a configuration is possible in which conditions of the carrier jet printer 40 such as the environment temperature at the time of printing are transferred from the carrier jet printer 40 to the host computer 20 and the printer driver selects a most suitable output characteristic conversion circuit 41 from among a plurality of converting means based on that information.

The conversion method of the output characteristic conversion circuit 41 is determined at the development stage of the carrier jet printer and the printer head 30. It is possible for a user to update the conversion method to a most suitable one at the time of version-up of the printer driver.

Where a replaceable printer head 30 or ink tanks are used, it is possible to allow updating of the conversion method to a most suitable one by attaching an output characteristic conversion circuit 41 to a new printer head or ink tanks.

Where the maximum dot gradation number of the above-described carrier jet printer 40 is insufficient and there exist unreproducible gradation levels, a dither-method-based multi-gradation dither control means that reproduces gradation levels through multi-valuing with a plurality of constant threshold values by performing dithering on a data value of one pixel may be provided in addition to the output characteristic conversion circuit 41. This enables stable multi-gradation output.

For example, where stable output levels of the carrier jet printer 40 are 4th, 6th, 8th, and 16th levels and the number of gradation levels of image data is larger than those numbers, reproduction is enabled by additionally using the multi-gradation dither method.

Figure 21:
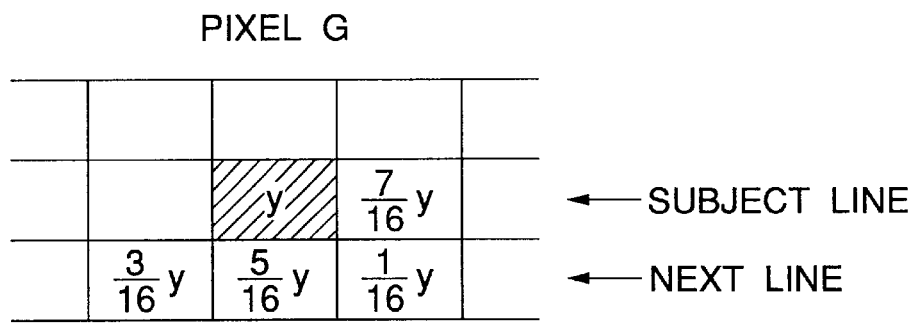
FIG. 21 is a schematic showing a multi-gradation dither method.

FIG. 21 illustrates a multi-gradation dither method employed in the invention, which specifically uses a multi-gradation error diffusion method. This method will be described below.

Referring to FIG. 21, for pixel G on a certain subject line, a relation ship, between an intended input level X for printing and a level X' that can be taken in actual printing is represented by Equation (1) below.

$$y = X - X' \quad (1)$$

That is, while the input level X is input image data itself and may be one of 256 gradation levels or more, usually the level X' that can be taken in actual printing is one of only several levels such as 4th, 6th, 8th, and 16th levels. Therefore, the error y exists between the input level X and the actual level X'. Where the error y of pixel G is distributed to pixels around pixel G so as to be added to their levels, there are many ways of determining surrounding pixels for distribution and their distribution ratios. FIG. 21 shows an example of distribution ratios that are set at 7/16, 3/16, 5/16, 1/16, etc. for respective positions around the subject pixel G.

Where the above multi-gradation dither control means is additionally used in the carrier jet printer 40 to which the invention is applied, it is preferable to incorporate the multi-gradation dither control means at the stage immediately before the output characteristic conversion circuit 41.

For example, optimum gradation expression can be attained by incorporating the multi-gradation dither control means in a printer driver, converting dither-processed data with the converting means in the printer driver or in the printer apparatus, and driving the printer head 30 by using that data.

Figure 22:
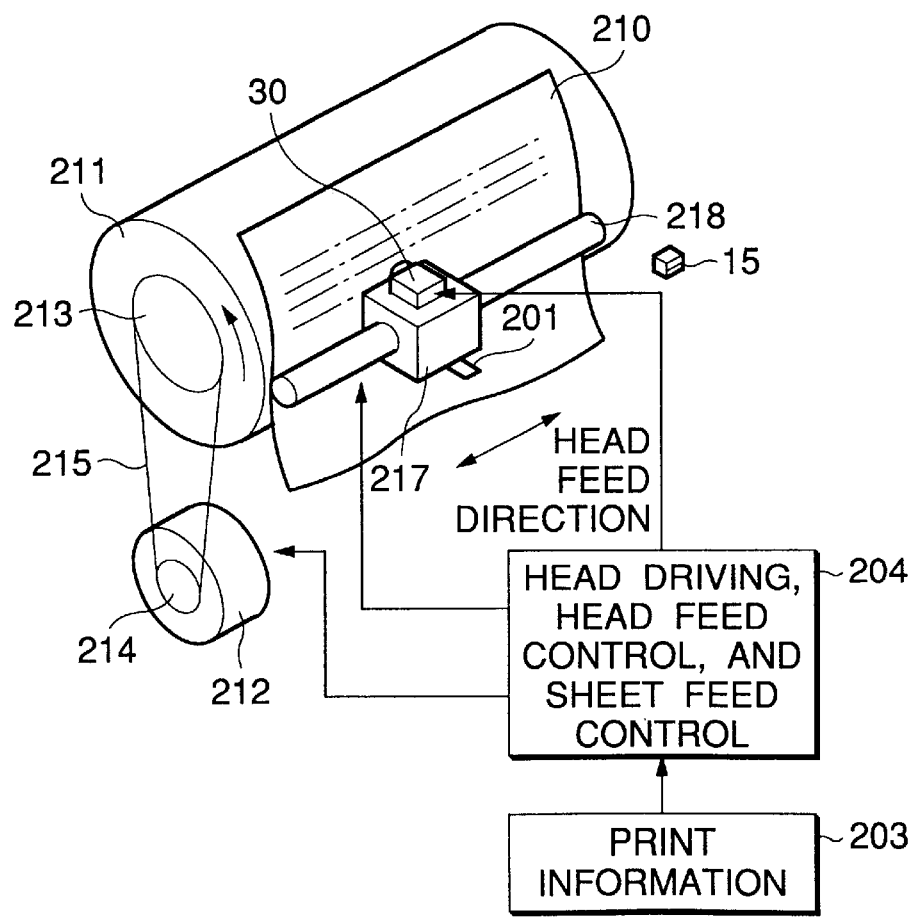
FIG. 22 shows the configuration of an example of a carrier jet printer used in the invention.

Next, the configuration of the carrier jet printer 40 will be described. FIG. 22 is a perspective view of a printer head mechanism of the carrier jet printer 40. A recording sheet 210 is fed in a state that it is wound around the circumferential surface of a platen 211, and the platen. 211 is rotationally driven by a sheet feed motor 212 via pulleys 213 and 214 and a belt 215.

The printer head 30 is mounted, via a head feed mechanism 217, on a feed screw 218 that is provided parallel with the circumferential surface of the platen 211, whereby the printer head 30 is moved parallel with the circumferential surface of the platen 211 by the head feed mechanism 217. The head feed mechanism 217 is provided with a tongue 201. The tongue 201 is detected by the head position sensor 15 that is provided in the movement path of the head feed mechanism 217, whereby the operating position of the printer head 30 is detected.

The printer head mixes ink 100 and a dilute 101 and jets a resulting mixture. As shown in FIG. 4, the printer head 30 has the quantifying nozzle 302, the jetting nozzle 303, the ink introduction hole 304, the dilute introduction hole 305, the quantifying-side cavity 306, the jetting-side cavity 307, the quantifying-side piezoelectric element 309, and the jetting-side piezoelectric element 310.

When input signals are supplied from the host computer 20 to the carrier jet printer 40, they are input to the output characteristic conversion circuit 41 and drive signals are supplied from the head driving circuit 42 to the printer head 30. The drive signals are supplied to the printer head 30, the head feed mechanism 217, and the sheet feed motor 212, and the print operation, the feed of the recording sheet 210, and the scanning of the printer head 30 are performed based on the drive signals.

The printer head 30 used in the invention has a single recording head or a plurality of recording heads.

Figure 23:
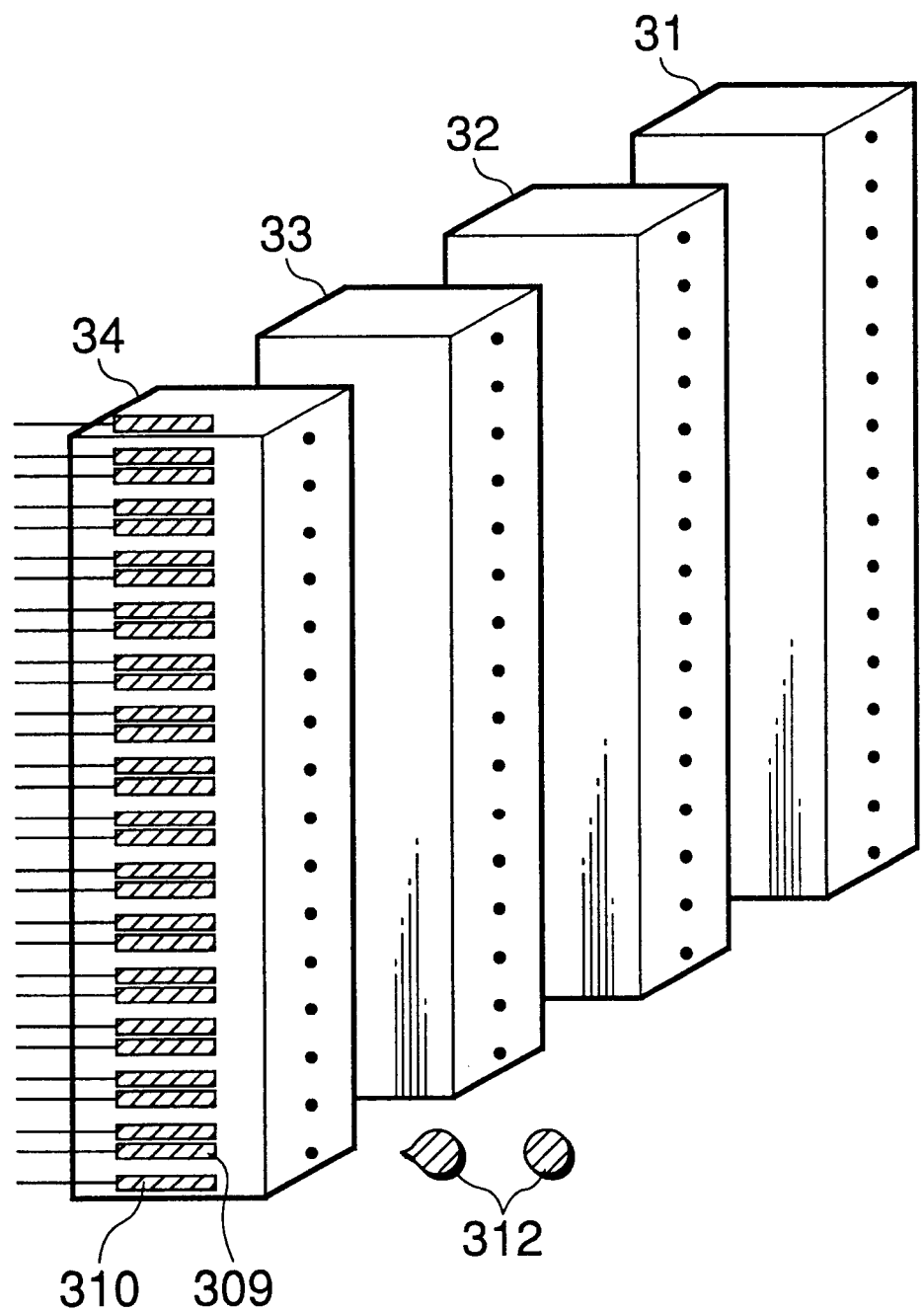
FIG. 23 is a perspective view showing the configuration of recording heads provided in the printer head used in the invention.

FIG. 23 illustrates the configuration of each recording head provided in the printer head 30. The body of each of recording heads 31–34 is provided with 16 nozzles. Each nozzle is provided with the piezoelectric elements 309 and 310, whereby ink droplets are jetted.

As described above in detail, in the above-configured printer apparatus according to the invention, since the converting means is provided that converts an input signal into a print signal so that the dot printing means mixes ink into a dilute even in a case where printing is performed based on an input signal that includes a dot information which is below threshold density determined by the dot printing means, ink of a correct amount can be mixed into a dilute even when printing is performed based on an input signal of a low density. Therefore, correct gradation expression is enabled, and there can be avoided a phenomenon that quantified ink is not mixed with a dilute even if the dot printing means is driven. Therefore, according to the, printer apparatus of the invention, gradation levels can be expressed in a desired manner and high-quality density gradation can be attained.

The converting means need not always be provided in the printer apparatus, and may be provided outside the printer apparatus and connected to it as in the case of a printer system according to the invention.

In the above-configured printer system according to the invention, since the converting means that performs the above conversion processing is provided, ink of a correct amount can be mixed into a dilute even when dots are printed. And there can be avoided a phenomenon that quantified ink is not mixed with a dilute even if the dot printing means is driven. Therefore, according to the printer system of the invention, gradation levels can be expressed in a desired manner and high-quality density gradation can be attained.

Further, in the above-configured driving method of a printer apparatus according to the invention, since the above conversion processing is provided, there can be avoided a phenomenon that quantified ink is not mixed with a dilute even if the dot printing means is driven. Therefore, according to the printer apparatus driving method of the invention, gradation levels can be expressed in a desired manner and high-quality density gradation can be attained.

What is claimed is:

1. A printer apparatus comprising:

a converting section for converting an input signal that includes information on dots to be printed into a print signal that is necessary for printing by performing predetermined conversion processing in the input signal; and dot printing means for printing the dots on a recording medium by forming an ink liquid for each dot by mixing ink and a dilute in a predetermined ratio based on the print signal, and jetting the ink liquid onto the recording medium, wherein the converting section converts the input signal into the print signal so that the dot printing means mixes the ink into the dilute even in a case where printing is performed based on an input signal that includes dot information which is below a threshold density determined by the dot printing means.

2. The printer apparatus according to claim 1, wherein the converting section has a conversion table that shows a relationship between the input signal and the print signal, and converts the input signal into the print signal by referring to the conversion table in performing the predetermined conversion processing.

3. The printer apparatus according to claim 1, wherein the input signal is a digital signal, and wherein the converting section converts the input signal into the print signal by performing the predetermined conversion processing with a logic circuit.

4. The printer apparatus according to claim 1, wherein the input signal is a digital signal, and wherein the converting section comprises a digital-to-analog converting section for converting the input signal into an analog signal and outputting the analog signal, and an analog converting section for converting the analog signal that has been output from the digital-to-analog converting section into the print signal by performing the predetermined conversion processing on the analog signal.

5. The printer apparatus according to claim 1, wherein the converting section comprises multi-gradation dither means for performing multi-gradation dither processing on the input signal.

6. A printer system comprising:

a converting section for converting an input signal that includes information on dots to be printed into a print signal that is necessary for printing by performing predetermined conversion processing on the input signal; and a printer apparatus comprising dot printing means for printing the dots on a recording medium by forming an ink liquid for each dot by mixing ink and a dilute in a predetermined ratio based on the print signal, and jetting the ink liquid into the recording medium, wherein the converting section converts the input signal into the print signal so that the dot printing means mixes the ink into the dilute even in a case where printing is performed based on an input signal that includes dot information which is below a threshold density determined by the dot printing means.

7. The printer system according to claim 6, wherein the converting section has a conversion table that shows a relationship between the input signal and the print signal, and converts the input signal into the print signal by referring to the conversion table in performing the predetermined conversion processing.

8. The printer system according to claim 6, wherein the input signal is a digital signal, and wherein the converting section converts the input signal into the print signal by performing the predetermined conversion processing with a logic circuit.

9. The printer system according to claim 6, wherein the input signal is a digital signal, and wherein the converting section comprises a digital-to-analog converting section for converting the input signal into an analog signal and outputting the analog signal, and an analog converting section for converting the analog signal that has been output from the digital-to-analog converting section into the print signal by performing the predetermined conversion processing on the analog signal.

10. The printer system according to claim 6, wherein the converting section comprises multi-gradation dither means for performing multi-gradation dither processing on the input signal.

11. A driving method of a printer apparatus, comprising the steps of:

converting an input signal that includes information on dots to be printed into a print signal that is necessary for printing by performing predetermined conversion processing on the input signal; and printing the dots on a recording medium by forming an ink liquid f or each dot by mixing ink and a dilute in a predetermined ratio based on the print signal, and jetting the ink liquid onto the recording medium, wherein in the predetermined conversion processing the input signal is converted into the print signal so that the ink is mixed into the dilute even in a case where printing is performed based on an input signal that includes information on a dot of a lowest density.

12. The driving method according to claim 11, wherein in the predetermined conversion processing the input signal is converted into the print signal by referring to a conversion table that shows a relationship between the input signal and the print signal.

13. The driving method according to claim 11, wherein the input signal is a digital signal, and wherein in the predetermined conversion processing the input signal is converted into the print signal with a logic circuit.

14. The driving method according to claim 11, wherein the input signal is a digital signal, and wherein the printing step comprises the substeps of converting the input signal into an analog signal and outputting the analog signal, and converting the analog signal into the print signal by performing the predetermined conversion processing on the analog signal.

15. The driving method according to claim 11, wherein in the predetermined conversion processing multi-gradation dither processing is performed on the input signal.

* * * * *

UNITED STATES PATENT AND TRADEMARK OFFICE
CERTIFICATE OF CORRECTION

PATENT NO.     : 6,341,832 B1
DATED          : January 29, 2002
INVENTOR(S)    : Toshio Narushima It is certified that error appears in the above-identified patent and that said Letters Patent is hereby corrected as shown below:

Column 18,
Line 49, replace "f or" with -- for --.

Signed and Sealed this

Twenty-fifth Day of February, 2003

JAMES E. ROGAN
*Director of the United States Patent and Trademark Office*